(12) United States Patent
Ueda et al.

(10) Patent No.: US 7,378,032 B2
(45) Date of Patent: May 27, 2008

(54) COATING COMPOSITION FOR LEATHER, COATING METHOD, AND COATED LEATHER

(75) Inventors: Akihiko Ueda, Settsu (JP); Masahiko Maeda, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 251 days.

(21) Appl. No.: 10/528,733

(22) PCT Filed: Dec. 18, 2003

(86) PCT No.: PCT/JP03/16232

§ 371 (c)(1),
(2), (4) Date: Mar. 23, 2005

(87) PCT Pub. No.: WO2004/059014

PCT Pub. Date: Jul. 15, 2004

(65) Prior Publication Data

US 2006/0150863 A1    Jul. 13, 2006

(30) Foreign Application Priority Data

Dec. 24, 2002 (JP) .............................. 2002-371567

(51) Int. Cl.
*C14C 11/00* (2006.01)
*D06N 3/00* (2006.01)
*C09D 127/12* (2006.01)
*C09D 183/04* (2006.01)

(52) U.S. Cl. .................. 252/8.57; 8/94.1 R; 69/21; 427/389; 428/423.1; 428/425.5; 428/473; 428/540; 428/904; 524/261

(58) Field of Classification Search ............... 252/8.57; 427/389; 428/423.1, 425.5, 473, 540, 904; 8/94.1 R; 69/21
See application file for complete search history.

(56) References Cited

U.S. PATENT DOCUMENTS 4,511,489 A  *  4/1985  Requejo et al. ............. 510/243
4,572,871 A  *  2/1986  Mabuchi et al. .......... 428/423.1
4,631,206 A  *  12/1986  Mabuchi et al. ............. 427/340
5,684,074 A  *  11/1997  Hirashima et al. ........... 524/265

FOREIGN PATENT DOCUMENTS

| CN | 1237991 A | 12/1999 |
|---|---|---|
| DE | 3438645 A1 * | 4/1986 |
| EP | 0464704 A | 1/1992 |
| EP | 0 705 884 A2 | 4/1996 |
| EP | 0 939 105 A1 | 9/1999 |
| EP | 0 978 537 A1 | 2/2000 |
| EP | 1123981 A1 | 8/2001 |
| GB | 1 454 960 A | 11/1976 |
| JP | 2-158672 A * | 6/1990 |
| JP | 2-158675 A * | 6/1990 |
| JP | 4-31474 A * | 2/1992 |
| JP | 4-279612 A | 10/1992 |
| JP | 4-285680 A * | 10/1992 |
| JP | 4-293982 A * | 10/1992 |
| JP | 8-60100 A | 3/1996 |
| JP | 10-147746 A | 6/1998 |
| JP | 11-061040 A | 3/1999 |
| JP | 11-302542 A | 11/1999 |
| JP | 11-302543 A | 11/1999 |
| JP | 2000-54000 A | 2/2000 |
| JP | 2002-69246 A | 3/2002 |
| KR | 1986-0004189 | 6/1986 |
| KR | 10-2001-0020445 | 3/2001 |
| KR | 2001-0057551 | 7/2001 |

* cited by examiner

*Primary Examiner*—Anthony J. Green
(74) *Attorney, Agent, or Firm*—Sughrue Mion, PLLC

(57) ABSTRACT

A paint composition for leather comprising a fluorine-containing resin and a silicone oil, and a paint composition for leather comprising a curable fluorine-containing resin, a curing agent and a silicone oil can have both soft feeling of a leather itself and film properties such as soil resistance and abrasion resistance.

18 Claims, No Drawings

COATING COMPOSITION FOR LEATHER, COATING METHOD, AND COATED LEATHER

FIELD OF THE INVENTION

The present invention relates to a coating composition for leather, a coating method and a coated leather.

BACKGROUND ART

A resin coating used for the surface finishing of a leather is conducted for the prevention of penetration of soil and easy wipe-off of attached sweat and soil, in addition to the protection of leather surface and beautification of appearance. As a surface coating film material for the leather, used are urethane resins, nitrocellulose lacquers, proteins such as casein, and fluorine-free resins such as higher fatty acid ester waxes. Among them, the urethane resins are widely used, because they are excellent in the coating film adherence, the softness, the transparency, the bend resistance, the low-temperature resistance, the chemical resistance, the heat resistance and the abrasion resistance.

However, conventional coating films are either hydrophilic or lipophilic, and an aqueous soil such as a mud and a soy sauce easily attaches to the hydrophilic coating film and an oily soil such as a skin fat, a lipstick and a ball point pen ink easily attaches to the lipophilic coating film and it is difficult to remove off these soils.

On the other hand, the coating of a fluororesin paint is applied to various substrates such as construction materials in view of the excellent soil resistance of the coating film. However, because the coating film is poor in softness, the fluororesin paint is not practically used for the leather which requires high softness.

For example, JP-A-4-279612 discloses a fluororesin coating composition and JP-A-10-147746 discloses a composition comprising a repellent such as a polyfluorinated carbon chain-containing compound and a silicone oil, as a fluororesin paint. However, these documents do not consider the leather use.

JP-A-2000-54000 discloses a leather having good soil resistance caused by applying a fluororesin paint to the leather, but the applied leather is not one satisfying all of the demand peculiar to leather such as feeling and matt appearance, and film properties such as soil resistance and abrasion resistance.

DISCLOSURE OF THE INVENTION

An object of the present invention is to provide a paint composition for hides and skin, which satisfies both (i) feeling and matt appearance peculiar to hide and skin, and (ii) film properties such as soil resistance and abrasion resistance.

The present invention relates to a paint composition for leather, which comprises a fluororesin and a silicone oil, or which comprises a curable fluororesin, a curing agent and a silicone oil.

The coating composition of the present invention may contain a matting agent.

According to the present invention, the feeling and the softness essential to the leather can be maintained, the leather can be sufficiently matted and the excellent soil resistance and abrasion resistance can be imparted.

EMBODIMENT FOR CARRYING OUT THE INVENTION

The fluororesin is a polymer of at least one fluoroolefin monomer, and may be a copolymer further containing a vinyl monomer. That is, the fluororesin is a polymer of the fluoroolefin monomer(s) or a polymer of the fluoroolefin(s) and the vinyl monomer(s). The vinyl monomer is a fluorine-containing vinyl monomer or a fluorine-free vinyl monomer.

The fluororesin may be either curable or non-curable. When the fluororesin is curable, the paint composition contains a curing agent.

The curable fluororesin has a curing reactive group. Examples of the curing reactive group of the curable fluororesin include a hydroxyl group, an amino group, an epoxy group, carboxyl group, mercapto group, a hydrolyzable silyl group (e.g., a trimethoxy silyl group and a triethoxy silyl group), an amide linkage, a urethane linkage and a urea linkage. The hydroxyl group is particularly preferable in view of the resin stability and the curing reactivity. The amount of the reactive group may have an upper limit of generally 0.5 mol, usually 0.4 mol, for example 0.35 mol, particularly 0.2 mol, and a lower limit of generally 0.001 mol, for example 0.005 mol, particularly 0.01 mol, based on 100 g of the curable fluororesin. When the reactive group is, for example, a hydroxyl group, the hydroxyl group is possessed preferably at a hydroxyl group value of at most 200 mg KOH/g.

The curable fluororesin is generally a copolymer between the fluoroolefin monomer and the vinyl monomer.

The vinyl monomer to be copolymerized with the fluoroolefin monomer is (1) only the vinyl monomer having curing reactive group, or (2) a combination of the vinyl monomer having curing reactive group and a vinyl monomer having no curing reactive group.

The amount of the fluoroolefin monomer is preferably at least 20 mol %, particularly from 20 to 60 mol %, based on the amount of the fluororesin.

The fluoroolefin monomer derives a fluoroolefin repeating unit constituting the fluororesin. The fluoroolefin repeating unit is preferably at least one of a chlorotrifluoroethylene (CTFE) unit, a tetrafluoro ethylene (TFE) unit, a trifluoro-ethylene (TrFE) unit, a hexafluoropropylene (HFP) unit, a vinylidene fluoride (VDF) unit or vinyl fluoride (VF) unit.

Examples of the vinyl monomer to be copolymerized with the fluoroolefin monomer include (i) a β-methyl-β-alkyl-substituted α-olefin, (ii) a vinyl group-containing ether, and (iii) a vinyl group-containing ester.

The monomers (i), (ii) and (iii) may be a curing reactive group-containing vinyl monomer.

The β-methyl-β-alkyl-substituted α-olefin (i) may be, for example, a compound of the formula:

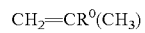
$CH_2=CR^0(CH_3)$ wherein $R^0$ is an alkyl group having 1 to 8 carbon atoms.

Specific examples of the monomer (i) include isobutylene, 2-methyl-1-butene, 2-methyl-1-pentene and 2-methyl-1-hexene.

The vinyl group-containing ether (ii) may be, for example, an alkyl vinyl ether or alkyl allyl ether of the formula:

$CH_2=CHR$ wherein R is $OR^{11}$ or $CH_2OR^{11}$ ($R^{11}$ is an alkyl group having 1 to 8 carbon atoms). When the vinyl group-containing ether (ii) has the hydroxyl group in the form of a hydroxyalkyl vinyl ether or a hydroxyalkyl allyl ether (In this case, $R^{11}$ is an alkyl group containing the hydroxyl group.), said hydroxyl group acts as a site reacting with the curing agent mentioned below.

The vinyl group-containing ether (ii) is not limited and specific examples thereof include ethyl vinyl ether, butyl vinyl ether, hexyl vinyl ether, cyclohexyl vinyl ether, 2-hydroxyethyl vinyl ether, 3-hydroxypropyl vinyl ether, 2-hydroxypropyl vinyl ether, 2-hydroxy-2-methylpropyl vinyl ether, 4-hydroxybutyl vinyl ether, 4-hydroxy-2-methylbutyl vinyl ether, 5-hydroxypentyl vinyl ether, 6-hydroxyhexyl vinyl ether, 2-hydroxyethyl allyl ether, 4-hydroxybutyl allyl ether, and glycerol monoallyl ether.

The vinyl group-containing ester (iii) may be, for example, a compound of the formula:

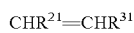

wherein $R^{21}$ is a hydrogen atom or $COOR^{41}$,
$R^{31}$ is $COOR^{41}$ or $OCOR^{41}$
($R^{41}$ is an alkyl group having 1 to 10 carbon atoms, a cycloalkyl group having 3 to 10 carbon atoms, a fluoroalkyl group having 1 to 10 carbon atoms, or a phenyl group which may substituted with an alkyl group having 1 to 8 carbon atoms. When $R^{31}$ is $OCOR^{41}$, $R^{21}$ is a hydrogen atom.).

Examples of the vinyl group-containing ester (iii) include a vinyl carboxylate of the formula:

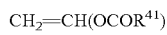

wherein $R^{41}$ is the same as defined above, and
a maleate diester or fumarate diester of the formula:

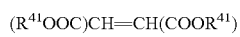

wherein $R^{41}$ is the same as defined above.

The vinyl carboxylate is not limited and examples thereof include vinyl acetate, vinyl propionate, vinyl butyrate, vinyl isobutyrate, vinyl pivalate, vinyl caproate, vinyl versatate, vinyl laurate, vinyl stearate, vinyl benzoate, vinyl p-t-butylbenzoate, vinyl salicylate, vinyl cyclohexane carboxylate, vinyl hexafluoropropionate and vinyl trichloroacetate.

The maleate diester and the fumarate diester are not limited and examples thereof include dimethyl maleate, diethyl maleate, dipropyl maleate, dibutyl maleate, diphenyl maleate, dibenzyl maleate, ditrityl maleate, ditrifluoromethyl maleate, ditrifluoroethyl maleate, dihexafluoropropyl maleate, dimethyl fumarate, diethyl fumarate, dipropyl fumarate, dibutyl fumarate, diphenyl fumarate, dibenzyl fumarate, ditrityl fumarate, ditrifluoromethyl fumarate, ditrifluoroethyl fumarate, and dihexafluoropropyl fumarate.

Examples of the vinyl monomer having curing reactive group include vinyl monomers wherein the curing reactive group is a hydroxyl group, a carboxyl group, an epoxy group, a silyl group or the like.

Examples of the vinyl monomer wherein the curing reactive group is the hydroxyl group include the hydroxyalkyl vinyl ether, the hydroxyalkyl vinyl ester and the like mentioned as the vinyl group-containing ether (ii).

Specific examples of the carboxyl group-containing vinyl monomer include one derived from crotonic acid, maleic acid, acrylic acid, methacrylic acid, itaconic acid, vinyl acetate or the like.

Specific examples of the epoxy group-containing vinyl monomer may be ones described in JP-A-2-232250 and JP-A-2-232251 and include an epoxy vinyl and an epoxy vinyl ether of the following formula:

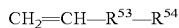

wherein $R^{53}$ is

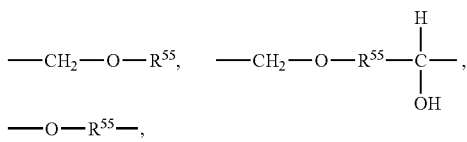

or $—R^{55}—$ (wherein $R^{55}$ is an alkylene group), and $R^{54}$ is

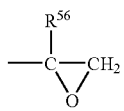

(wherein $R^{56}$ is a hydrogen atom or an alkyl group),

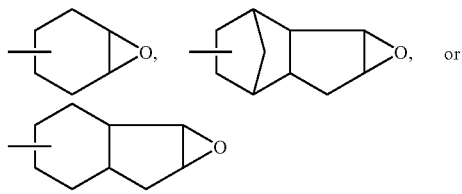

Specific examples thereof are as follows:

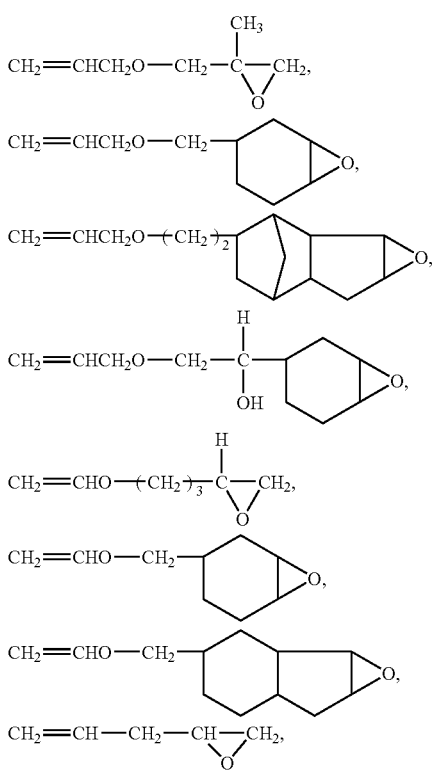

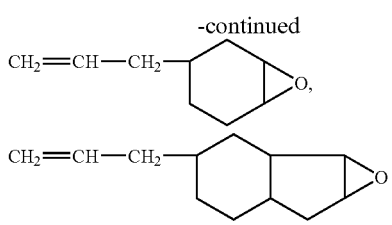

Specific examples of the silyl group-containing vinyl monomer may be ones described in JP-A-61-141713 and include vinyl trimethoxysilane, vinyl triethoxysilane, vinyl tripropoxysilane, vinyl methyldimethoxysilane, vinyl dimethylmethoxysilane, vinyl methyldiethoxysilane, vinyl tris (β-methoxy)silane, trimethoxysilylethyl vinyl ether, triethoxysilylethyl vinyl ether, trimethoxysilylbutyl vinyl ether, triethoxysilylbutyl vinyl ether, trimethoxysilylpropyl vinyl ether, triethoxysilylpropyl vinyl ether, vinyl triisopropenyloxysilane, vinyl methyl diisopropenyloxysilane, triisopropenyloxysilylethyl vinyl ether, triisopropenyloxysilylpropyl vinyl ether, triisopropenyloxysilylbutyl vinyl ether, vinyl tris(dimethyliminoxy)silane, vinyl tris(methylethyliminoxy)silane, vinyl methylbis(methyldimethyliminoxy) silane, vinyl dimethyl(dimethyliminoxy)silane, tris(dimethyliminoxy)silylethyl vinyl ether, methylbis(dimethyliminoxy)silylethyl vinyl ether, tris(dimethyliminoxy)silylbutyl vinyl ether, γ-(meth)acryloyloxypropyl trimethoxysilane, γ-(meth)acryloyloxypropyl triethoxysilane, γ-(meth)acryloyloxypropyl methyldimethoxysilane, γ-(meth)acryloyloxypropyl triisopropenyloxysilane, γ-(meth)acryloyloxypropyl tris(dimethyliminoxy)silane, γ-(meth)acryloyloxypropyl tris(dimethyliminoxy)silane and allyl trimethoxysilane.

A polymerization method for producing a copolymer comprising the fluoroolefin monomer and the vinyl monomer is not particularly limited and may be a conventional method, for example, an emulsion polymerization, a suspension polymerization, a solution polymerization and a bulk polymerization which can be suitably selected.

A polymerization reactor, a polymerization method, a polymerization initiator, a polymerization inhibitor, and other aids used for the polymerization, an emulsification aid, a surface active agent and other additives used for the emulsion polymerization are suitably selected from the conventional ones. Any of the conventional ones can be selected from the above matters provided that a resultant copolymer is suitable.

A solvent for the polymer prepared by the polymerization is not limited. The solvent is preferably ketones or esters having particularly a boiling point of about 60 to 250° C. in view of solubility. Examples of the solvent include acetone, methyl ethyl ketone, methyl i-butyl ketone, cyclohexanone, ethyl acetate, n-butyl acetate, and methyl cellosolve acetate. These can be used alone or in combination of at least two. Other examples of the organic solvent include tetrahydrofuran (THF) and dimethyl formamide (DMF) and aromatic organic compounds such as toluene and xylene and alcohols may be added. The organic solvent sufficiently dissolves the organic solvent-soluble fluorine-containing resin to give a composition comprising the resin in a wide concentration range between a low concentration and a high concentration.

An average molecular weight (according to GPC) of the fluorine-containing resin may be from 1,000 to 500,000, particularly from 1,500 to 100,000.

Specific examples of the curable fluorine-containing resin are curable fluorine-containing resins described in, for example, JP-B-60-21686, JP-A-3-121107, JP-A-4-279612, JP-A-4-28707 and JP-A-2-232221.

The fluorine-containing resin may be a blend of at least fluorine-containing resins. The fluorine-containing resin may be blended with one or at least two other resins. Examples of the other resin include a styrene resin, a (meth)acrylic resin, a polyester resin, an alkyd resin, a melamine-formaldehyde resin, a polyisocyanate-based resin, an epoxy resin, a vinyl chloride resin (for example, a vinyl chloride/vinyl acetate copolymer), a ketone resin, a petroleum resin, a chlorinated product of polyolefins such as polyethylene and polypropylene, an inorganic resin such as silica gel and silicate, and a fluororesin (for example, a fluoroalkyl group-containing resin) which does not include a fluoroolefin, and the other resin is not limited to these.

The curing agent is one which reacts with a curing reactive group of the curable fluorine-containing resin to cure the fluorine-containing resin. Examples of the curing agent include an isocyanate compound, an amino resin, an acid anhydride, polysilane compound, a polyexpoxy compound and an isocyanate group-containing silane compound.

Non-limiting specific examples of the isocyanate compound include 2,4-tolylene diisocyanate, diphenylmethane-4,4'-diisocyanate, xylylene diisocyanate, isophorone diisocyanate, lysine methyl ester diisocyanate, methylcyclohexyl diisocyanate, trimethylhexamethylene diisocyanate, hexamethylene diisocyanate, n-pentane-1,4-diisocyanate, a trimer thereof, an adduct product and biuret product thereof, a polymer thereof having at least two isocyanate groups, and a blocked isocyanate.

Non-limiting specific examples of the amino resin include a urea resin; a melamine resin; a benzoguanamine resin; glycoluril resin; a methylolated melamine resin in which a melamine resin is methylolated; and an alkyl-etherized melamine resin in which a methylolated melamine is etherized with an alcohol such as methanol, ethanol and butanol.

Non-limiting specific examples of the acid anhydride include phthalic anhydride, pyromellitic anhydride and mellitic anhydride.

Examples of the polysilane compound include a compound having at least two groups selected from a SiOH group and a hydrolyzable group directly bonded to a silicon atom; and a condensate of said compound. For example, compounds described in JP-A-2-232250 and JP-A-2-232251 can be used as the polysilane compound. Specific examples of the polysilane compound include dimethyldimethoxysilane, dibutyldimethoxysilane, diisopropyldipropoxysilane, diphenyldibutoxysilane, diphenylethoxysilane, diethyl disilanol, dihexyl disilanol, methyltrimethoxysilane, methyltriethoxysilane, ethyltriethoxysilane, propyltrimethoxysilane, phenyltriethoxysilane, phenyltributoxysilane, hexyltriacetoxysilane, methyltrisilanol, phenyltrisilanol, tetramethoxysilane, tetraethoxysilane, tetrapropoxysilane, tetraacetoxysilane, diisopropoxydivaleroxysilane, and tetrasilanol.

Examples of the polyepoxy compound and isocyanate group-containing silane compound include compounds described in JP-A-2-232250 and JP-A-2-232251. Preferable examples thereof include the followings:

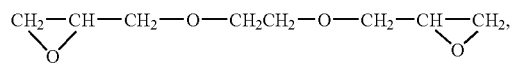

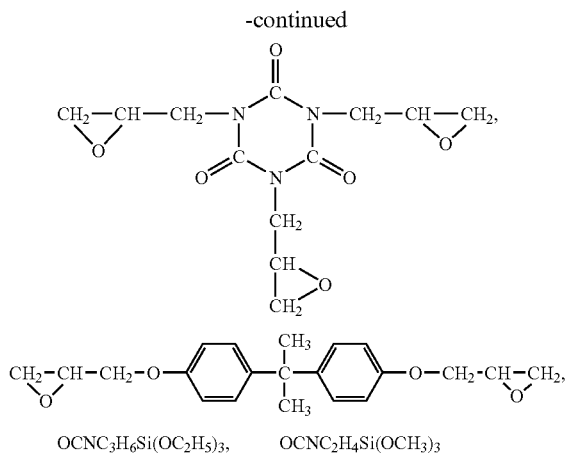

OCNC₃H₆Si(OC₂H₅)₃,    OCNC₂H₄Si(OCH₃)₃

The amount of the curing agent may be from 0.1 to 5 equivalents, preferably from 0.5 to 1. 5 equivalents, based on 1 equivalent of curing reactive group in the curable fluorine-containing resin.

The silicone oil used in the present invention may be any of a straight silicone oil and a modified silicone oil. Examples of the silicone oil include dimethyl silicone, methylphenyl silicone, methylhydrogen silicone, cyclic polydimethylsiloxane, alkyl-modified silicone, alcohol-modified silicone, amino-modified silicone, fluoroalkyl-modified silicone, chloroalkyl-modified silicone, and other organic modified silicones.

Non-limiting specific examples of the silicone oil include the followings:

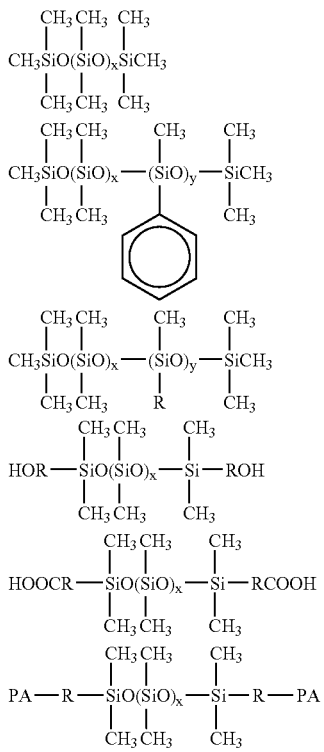

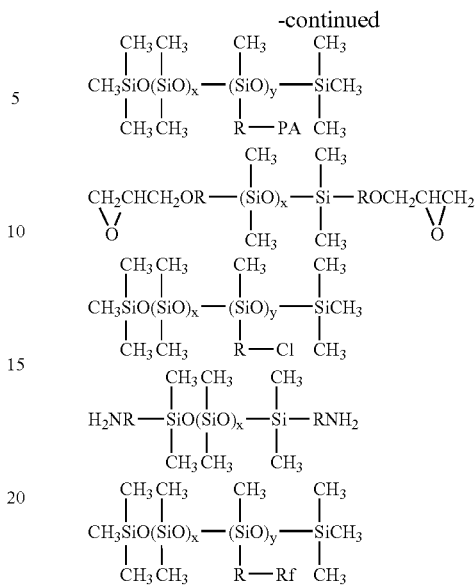

wherein R is an alkylene group having at least one carbon atom,
PA is a polyalkylene oxide,
Rf is a perfluoroalkyl group containing an alkyl group having 4 to 20 carbon atoms,
x is an integer of 0 or at least 1, and
y is an integer of at least 1.

Specific examples of the silicone oil are PRX413 (manufactured by Dow Corning Toray Silicone Co., Ltd.), SF8417 (ditto), SF8418 (ditto), BY16-855B (ditto), SF8427 (ditto), SF8428 (ditto), FS1265 (ditto), X-22-161C (manufactured by Shin-Etsu Chemical Co., Ltd.), KF-857 (ditto), KP-358 (ditto), KP-359 (ditto), X-22-819 (ditto), and FL100 (ditto).

The amount of the silicone oil may be from 1 to 50 parts by weight, for example, 2 to 30 parts by weight, based on 100 parts by weight of the fluorine-containing resin.

If the appearance of matting is necessary according to the applications of coated leather, a matting agent can be contained in the fluorine-containing resin paint composition.

The matting agent may be any of inorganic or organic and used in combination of at least two.

Non-limiting specific examples of the matting agent include a silica matting agent comprising silica fine powder, and an organic matting agent such as polyethylene or acrylic beads.

The matting agent may be modified for the purpose of increasing the dispersibility.

The amount of the matting agent is generally at most 50 parts by weight, more preferably at most 40 parts by weight, based on 100 parts by weight of the fluorine-containing resin.

The fluorine-containing resin coating composition of the present invention may contain various additives. Examples of the additive include, conventionally known, a curing accelerator, a pigment, a pigment dispersing agent, a dye, a leveling agent, an antifoaming agent, an antigelling agent, an ultraviolet absorbing agent, an antioxidation agent, a plasticizer, a thickening agent, a rot-proofing agent, a fungi-proofing agent, a mildew-proofing agent, and a flame retardant.

Examples of the curing accelerator include an organic tin compound, an acidic phosphate ester, a reaction product between the acidic phosphate ester and an amine, a saturated or unsaturated polycarboxylic acid or anhydride thereof, an organic titanate compound, an amine compound, and lead octoate. The curing agent may be used alone or in combination of at least two.

The amount of the curing accelerator is preferably from about $1.0\times10^{-6}$ to about $1.0\times10^{-2}$ parts by weight, more preferably from about $5.0\times10^{-5}$ to about $1.0\times10^{-3}$, based on 100 parts by weight of the fluorine-containing resin.

In the present invention, the coating composition may be in the form of an organic solvent paint, an aqueous dispersion paint or a non-aqueous dispersion paint.

Examples of a solvent used in the organic solvent paint include esters such as ethyl acetate, butyl acetate, isopropyl acetate, isobutyl acetate, cellosolve acetate, propyleneglycol methyl ether acetate; ketones such as acetone, methyl ethyl ketone, methyl isobutyl ketone and cyclohexanone; cyclic ethers such as tetrahydrofuran and dioxane; amides such as N,N-dimethyl formamide and N,N-dimethyl acetamide; aromatic hydrocarbons such as toluene and xylene; alcohols such as propyleneglycol methyl ether; hydrocarbons such as hexane and heptane; a mixture solvent thereof. The concentration of solid components in the organic solvent paint is from 1 to 95% by weight, preferably from 5 to 70% by weight.

The coated leather of the present invention coated with the fluorine-containing resin can be prepared by coating the fluorine-containing resin coating composition on the leather directly or indirectly through a primer layer, and then drying and curing the composition.

The primer may be conventional primers for leather. Examples of the primer include a paint comprising an acrylic resin, a methacrylic resin, a urethane resin, an acrylonitrile resin, a butadiene resin, a styrene resin, a vinyl chloride resin, a vinylidene chloride resin, a vinyl acetate resin or a mixture of at least two thereof The formation of the primer layer improves the smoothness and the uniformity of appearance. The amount of the primer layer coated may be at least 1 $g/m^2$, for example, from 1 to 100 $g/m^2$.

The coating amount (solid content) of the fluorine-containing resin paint film may be at least 2 $g/m^2$, for example, from 2 to 100 $g/m^2$. The fluorine-containing resin paint film forms an outermost layer of the coated leather.

The coating method is not limited, and a spray coating, a brush coating, a curtain coating, a roll coating and the like can be used.

The paint film can be dried and cured usually at 0 to 200° C. for 2 or 3 seconds to 10 days. The drying and curing method of the paint film vary depending on types of the curing agent and curing accelerator, a coating amount, and type of leather and the like. Examples of said drying and curing method include (1) a method of keeping standing at room temperature for at least one day, (2) a method of keeping standing in 50° C. hot air dryer for at least 30 seconds, (3) a method of heating by an infrared heating machine for at least 10 seconds.

The leather to be coated may be natural skin or fur, or a leather-like substrate. Various leathers may be used. Examples of the leather include a natural leather, and a leather-like material such as an artificial leather, a synthetic leather and a vinyl leather.

Examples of animal from which the natural leather is originated include a cow, a sheep, a goat, a pig, a horse, a kangaroo and a deer. A resin film may be laminated on the natural leather.

Examples of the leather-like material include an artificial leather, a synthetic leather, and a vinyl leather. Examples of a surface layer resin for these leathers include a polyurethane resin, a polyvinyl chloride resin, a polyolefin resin and nylon.

The fluorine-containing paint film of the present invention has excellent transparency so that the paint film is applied directly or through a transparent primer layer on the leather, and a surface design of the leather can be utilized. When the primer is mixed with a pigment to color the primer layer, or when the fluorine-containing resin paint is mixed with the pigment to color the paint, the color of the pigment can be vividly shown. The leather coated with the fluorine-containing resin paint of the present invention has excellent soil releasability and abrasion resistance and excellent design.

The leather coated with the fluorine-containing resin of the present invention can be processed to give various leather products. Examples of the leather products are interiors of building constructions; interiors of vehicles such as a seat, headrest, armrest, steering, door interior and ceiling interior of an automobile, a seat or interior of an aircraft, a seat of a rail way vehicle, and a seat of a ship; leather furniture items such as a sofa, a living chair, a dining chair and a table; leather shoes such as boots, pumps, business shoes, sports shoes and hard shoes; leather bags such as a school child's satchel, a handbag, a shoulder bag, a porch, a Boston bag and rucksack; leather clothes such as a skirt, a coat, pants, a jacket, a rider suit, a ski wear, a glove and a cap; leather accessories such as a purse, a belt, a watch band, a pocket diary, a harness and a book cover; and a raw material for handicrafts. The leather product can be prepared by cutting and sewing the coated leather of the present invention or by shaping the leather in the form of the leather product and then coating the shaped leather.

PREFERRED EMBODIMENTS OF THE INVENTION

The fluorine-containing resin-coated leather of the present invention is illustrated by the following Examples which do not limit the present invention. "Part" and "%" in the Examples are respectively "part by weight" and "% by weight".

EXAMPLE 1

A tetrafluoroethylene/isobutyrene/hydroxybutyl vinyl ether/vinyl pivalate (50/25/10/15 wt %) copolymer (resin hydroxyl group value: 60 mg KOH/g) (100 parts) as a curable fluorine-containing resin, a hexamethylene diisocyanate trimer (NCO value of solid content: 20%) (22 parts) as a curing agent, a silica fine powder (average particle diameter: 4 μm) (15 parts) as a matting agent, and an amino-modified silicone oil (10 parts) as a silicone oil were dispersed in 900 parts of butyl acetate to give a curable fluorine-containing resin paint composition.

This composition (200 g) was coated by a spray gun on a cow hide (1 $m^2$) coated with a commercial leather primer urethane resin paint, and heated at 50° C. for 2 minutes to give a fluorine-containing resin-coated leather having an outermost fluorine-containing resin film layer.

The fluorine-containing resin-coated leather prepared in Example 1 was evaluated in the following methods. Results are shown in Table 1.

(1) Matteness Degree

A 60 degree specular gloss degree of a surface of the coated leather is measured by a gloss meter according to JIS K5400. The lower the gloss degree is, the higher the matteness degree is.

(2) Feeling

The softness feeling of the coated leather is evaluated by touch feeling according to the following criteria.
A: Very soft
B: Soft
C: Medium
D: Hard
E: Very hard (3) Soil Releasability The soil material described below is attached to a surface of the coated leather and kept for 30 minutes.

Then, a cotton fabric is soaked with a 30 wt % aqueous solution of a commercial kitchen neutral detergent and the soil deposited on the coated leather is lightly wiped by the cotton fabric. The state of the residual soil on the leather surface is evaluated according to the following criteria.
A: Soil can be removed very easily.
B: Soil can be removed.
C: Soil remains in a small amount.
D: Soil remains in an about half amount.
E: Soil remains in an almost amount.

Soil Materials:

Lipstick: "CALIFORNIA COLORS NO. 4" manufactured by Nihon Kolmar Co., Ltd. Ball point pen: Oily ball point pen (black) manufactured by Mitsubishi pencil Co., Ltd.

(4) Abrasion Resistance

The coated leather is rubbed with an abrasion wheel CS-10 by a Taber abrasion tester and the surface state is visually observed every 1,000 revolutions.

The number of revolutions, at which the abrasion is observed on the coating film, is measured.

The larger the number of revolutions is, the higher the abrasion resistance is.

EXAMPLE 2

The same procedure as in Example 1 was repeated except that the amount of the matting agent was changed to 30 parts to give a fluorine-containing resin-coated leather.

Results are shown in Table 1.

COMPARATIVE EXAMPLES 1 AND 2

The same procedures as in Examples 1 and 2 were repeated except that the silicone oil was not added to give a fluorine-containing resin-coated leather control.

Results are shown in Table 1.

COMPARATIVE EXAMPLE 3

The same procedure as in Example 1 was repeated except that a commercially available paint additive for leather (a hydrocarbon oil) was used instead of the silicone oil to give a fluorine-containing resin-coated leather control.

Results are shown in Table 1.

TABLE 1

|  | Example | | Comparative Example | | |
|---|---|---|---|---|---|
|  | 1 | 2 | 1 | 2 | 3 |
| Matteness degree (gloss degree) | 4 | 2 | 4 | 2 | 4 |
| Feeling (A-E) | A | A | C | E | B |
| Soil resistance (A-E) Lipstick | A | B | B | E | E |
| Soil resistance (A-E) Ball point pen | A | B | B | E | E |
| Abrasion resistance (revolution number) | 5,000 | 5,000 | 3,000 | 1,000 | 3,000 |

The invention claimed is:

1. A paint composition for leather, comprising 100 parts by weight of a fluorine-containing resin, 1 to 50 parts by weight of a silicone oil, and a matting agent,
   wherein the matting agent is present in an amount of at most 50 parts by weight of the matting agent based on 100 parts by weight of the fluorine-containing resin,
   wherein the fluorine-containing resin is a polymer of at least one fluoroolefin monomer or a polymer of at least one fluoroolefin and at least one vinyl monomer,
   wherein the fluoroolefin monomer is at least one selected from the group consisting of chlorotrifluoroethylene (CTFE), tetrafluoroethylene (TFE), trifluoroethylene (TrFE), hexafluoropropylene (HFP), vinylidene fluoride (VDF) and vinyl fluoride (VF), and
   wherein the silicone oil is at least one selected from the group consisting of dimethyl silicone, methylphenyl silicone, methylhydrogen silicone, cyclic polydimethylsiloxane, alkyl-modified silicone, alcohol-modified silicone, amino-modified silicone, fluoroalkyl-modified silicone, chloroalkyl-modified silicone, and other organic modified silicones.

2. The paint composition according to claim 1, wherein the matting agent is present in an amount of from 15 to at most 50 parts by weight of the matting agent based on 100 parts by weight of the fluorine-containing resin.

3. A paint composition for leather, comprising 100 parts by weight of a curable fluorine-containing resin, a curing agent in the amount of 0.1 to 5 equivalents per 1 equivalent of a curing reactive group in the curable fluorine-containing resin, 1 to 50 parts by weight of a silicone oil, and a matting agent,
   wherein the matting agent is present in an amount of at most 50 parts by weight of a matting agent based on 100 parts by weight of the curable fluorine-containing resin,
   wherein the curable fluorine-containing resin is a polymer of at least one fluoroolefin monomer or a polymer of at least one fluoroolefin and at least one vinyl monomer,
   wherein the fluoroolefin monomer is at least one selected from the group consisting of chlorotrifluoroethylene (CTFE), tetrafluoroethylene (TFE), trifluoroethylene (TrFE), hexafluoropropylene (HFP), vinylidene fluoride (VDF) and vinyl fluoride (VF), and
   wherein the silicone oil is at least one selected from the group consisting of dimethyl silicone, methylphenyl silicone, methyihydrogen silicone, cyclic polydimethylsiloxane, alkyl-modified silicone, alcohol-modified silicone, amino-modified silicone, fluoroalkyl-modified silicone, chloroalkyl-modified silicone, and other owanic modified silicones.

4. The paint composition according to claim 3, wherein the curable fluorine-containing resin contains a curing reactive group.

5. The paint composition according to claim 4, wherein the curing reactive group of the curable fluorine-containing resin is at least one selected from the group consisting of a hydroxyl group, an amino group, an epoxy group, a carboxyl group, a mercapto group, a hydrolyzable silyl group, an amide linkage, a urethane linkage and a urea linkage.

6. The paint composition according to claim 3, wherein the curing agent is selected from the group consisting of an isocyanate compound, an amino resin, an acid anhydride, polysilane compound, a polyexpoxy compound and an isocyanate group-containing silane compound.

7. The paint composition according to claim 3, wherein the matting agent is present in an amount of from 15 to at most 50 parts by weight of the matting agent based on 100 parts by weight of the fluorine-containing resin.

8. The paint composition according to claim 1 or 3, wherein the vinyl monomer to be copolymerized with the fluoroolefin monomer is selected from the group consisting of (i) a β-methyl-β-alkyl-substituted α-olefin, (ii) a vinyl group-containing ether, and (iii) a vinyl group-containing ester.

9. The paint composition according to claim 1 or 3, wherein the matting agent is inorganic, organic or a combination thereof.

10. The paint composition according to claim 1 or 3, wherein the matting agent is at least one selected from the group consisting of a silica matting agent comprising silica fine powder, a polyethylene beads matting agent and an acrylic beads matting agent.

11. A method of producing a coated leather, which comprises coating the paint composition according to claim 1 on a leather.

12. A coated leather produced by the method according to claim 11.

13. The coated leather according to claim 12, wherein the leather is a natural leather or an artificial leather.

14. The coated leather according to claim 12, which forms part of an interior of a building construction, an interior of a vehicle, a furniture item, a shoe, a bag, clothes and a leather accessory.

15. A method of producing a coated leather, which comprises coating the paint composition according to claim 3 on a leather.

16. A coated leather produced by the method according to claim 15.

17. The coated leather according to claim 16, wherein the leather is a natural leather or an artificial leather.

18. The coated leather according to claim 17, which forms part of an interior of a building construction, an interior of a vehicle, a furniture item, a shoe, a bag, clothes and a leather accessory.

* * * * *